Dec. 26, 1944.   W. A. HAMILTON   2,365,951
AIRCRAFT CONTROL
Filed Nov. 13, 1940   2 Sheets-Sheet 1

INVENTOR.
WALTER A. HAMILTON.
BY
HIS PATENT ATTORNEY.

Dec. 26, 1944.　　　W. A. HAMILTON　　　2,365,951
AIRCRAFT CONTROL
Filed Nov. 13, 1940　　　2 Sheets-Sheet 2
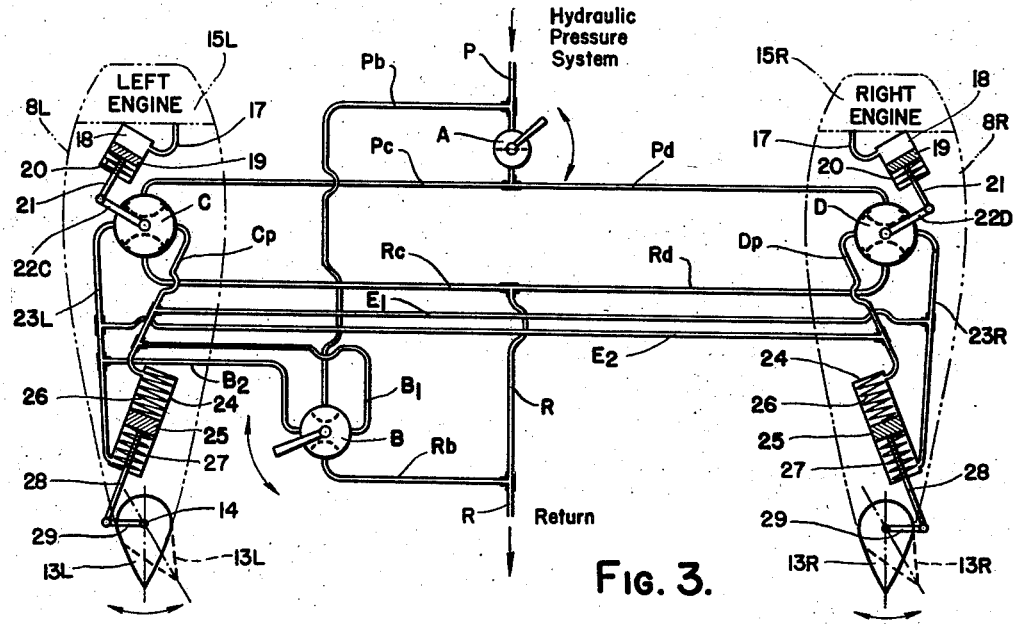
FIG. 3.
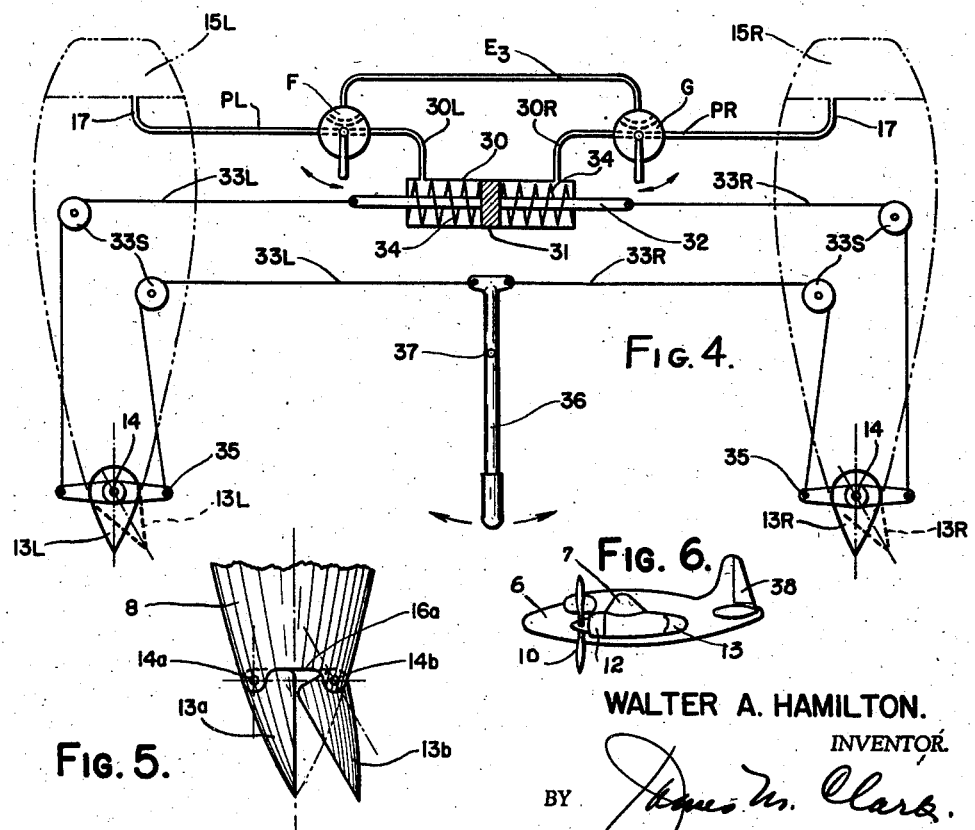
FIG. 4.
FIG. 5.
FIG. 6.
WALTER A. HAMILTON.
INVENTOR.
BY
HIS PATENT ATTORNEY.

Patented Dec. 26, 1944

2,365,951

UNITED STATES PATENT OFFICE 2,365,951

AIRCRAFT CONTROL

Walter A. Hamilton, Burbank, Calif., assignor to Douglas Aircraft Company, Inc., a corporation of Delaware Application November 13, 1940, Serial No. 365,426

11 Claims. (Cl. 244—78)

The present invention relates to the control of aircraft and more particularly to means for correcting unbalanced thrust conditions due to engine failure in aircraft equipped with more than one engine.

In the operation of multi-engined aircraft the failure of an engine on one side of the airplane causes yawing or turning of the craft about its normal or vertical axis toward the side of the stopped engine due to the excessive thrust exerted by the engine, or engines, on the other side of the craft. This condition usually is corrected, or compensated for, by suitable adjustment of the rudder control surfaces, or tabs, associated therewith; and in large, or high performance aircraft this frequently requires the application of considerable forces on the part of the pilot, which effort becomes very tiring and strenuous if continued flight is required to be maintained. Various solutions of the problem created by this condition have been suggested and used, such as by providing special forms and positioning of the control surfaces, feathering of the stopped propeller, slowing down of the engine or engines on the over-powered side of the craft and other expedients. While some of these solutions have met with partial success they invariably subject the pilot to the necessity of making additional adjustments to the power plants or rudder surfaces and usually result in complicating these controls and interfere materially with his normal operation of the aircraft.

The present invention is directed to improvements in the operation of aircraft under these and similar conditions by the provision of control surfaces carried within the engine nacelles which may be operated either manually by the pilot, or automatically upon the stoppage of an engine or motor.

It is accordingly an object of the present invention to provide means for the automatic or manual correction of yawing or turning tendencies of an aircraft caused by stoppage or slowing down of an engine disposed laterally of the plane of symmetry of the aircraft. It is a further object to provide such means which are separate from, and do not interfere with, the normal control surfaces of the aircraft. A further object resides in the provision of novel control surfaces carried by the engine nacelles in a manner in which they do not add to the total surface resistance of the nacelles during the normal functioning of the engines at which time they are completely faired within and form streamlined continuations of the surfaces of the nacelles when not actually in operation. A further object provides for the actuation of such nacelle control surfaces by the hydraulic pressure of the lubricating oil systems of the respective motors, and to automatically adjust such surfaces upon drop in oil pressure of the engine which has slowed down or stopped. Other objects reside in the provision of novel nacelle rudder control systems which are selectively operable either automatically or manually; and also in improved split, nacelle rudders.

Other objects and advantages of the present invention will present themselves to those skilled in this art after a reading of the present specification and the accompanying drawings forming a part hereof, in which:

Fig. 3 is a diagrammatic plan view of a hydraulic system for automatic and manual operation of the nacelle control surfaces;

Fig. 4 is a diagrammatic plan view of a modification showing a combined hydraulic-mechanical system for similar operation of the nacelle surfaces;

Fig. 5 shows an enlarged detail view of the trailing portion of an engine nacelle provided with a split trailing edge rudder of a modified form; and Fig. 6 is a small scale side elevation of an airplane provided with both a conventional empennage rudder and the nacelle rudders of this invention.

Figure 1:
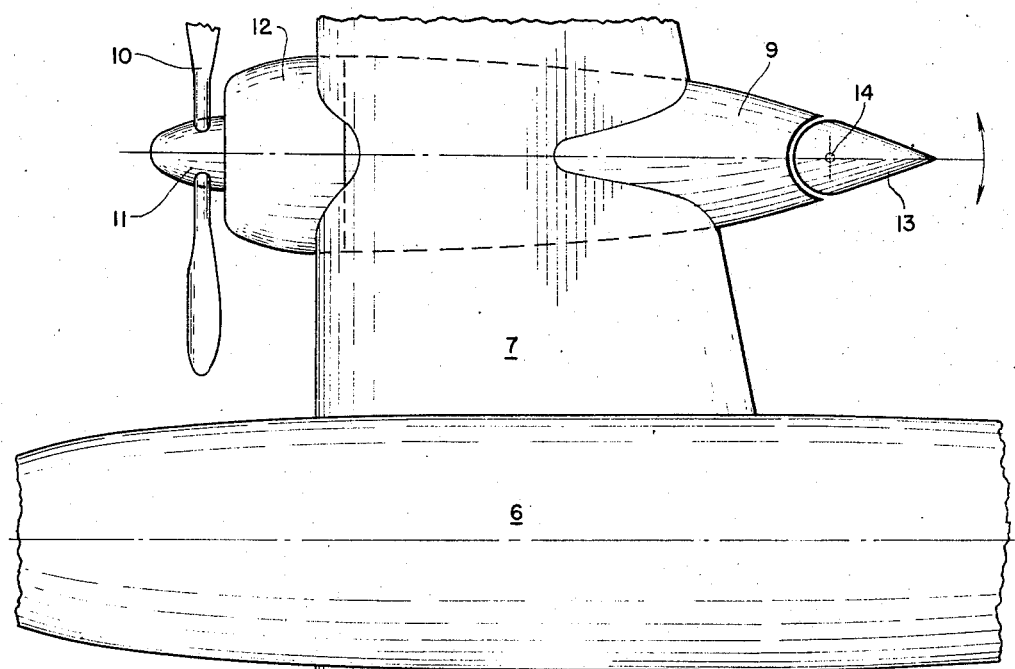
Fig. 1 shows a plan view of a bi-motored airplane in which the motor nacelles are provided with the control surfaces and operating mechanism of my invention.
Figure 2:
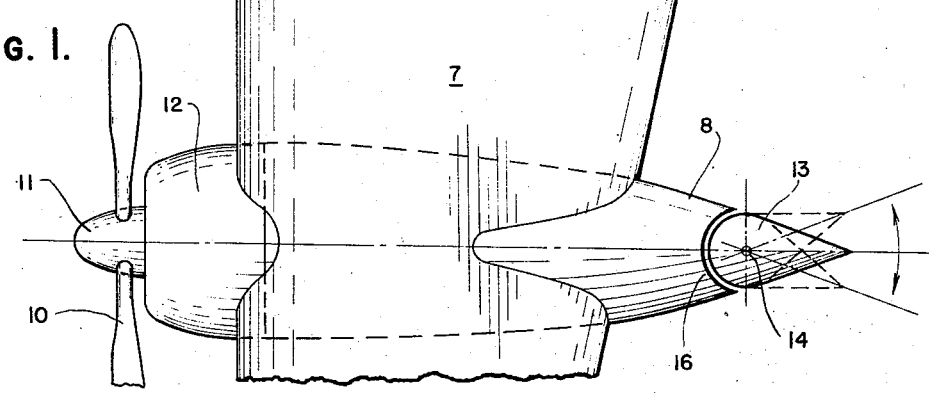
Fig. 2 shows an elevational view of one of the nacelles and its control surfaces.
Figure 2:
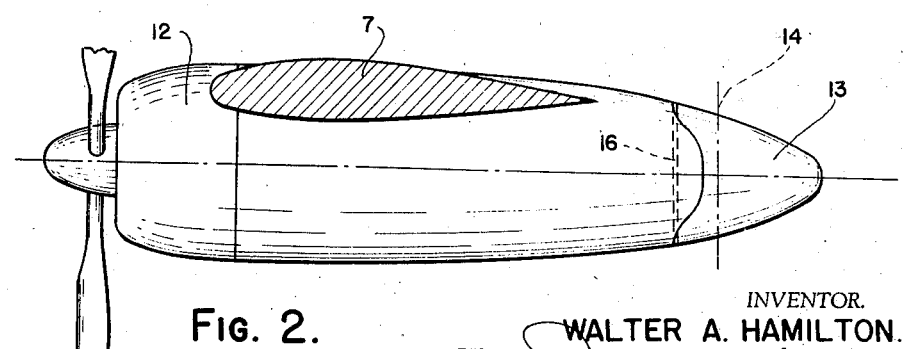

Referring now to Fig. 1, the numeral 6 represents the fuselage or body of a bi-motored aircraft provided with wings 7 from which are supported the left engine, or motor, and its nacelle 8, and the right engine and its nacelle 9. Each of the engines which are housed in the nacelles 8 and 9 are provided with conventional tractor propellers 10, spinners 11 and the engines are housed within the forward cowl portions 12. The airplane is further preferably provided with a suitable or conventional control system having a main or empennage rudder 38 mounted upon the rear portion of its fuselage as shown in Fig. 6. While Figs. 1 and 2 disclose a plan view of a bi-motored low-wing monoplane it is to be understood that the present invention is also applicable to aircraft having more than two motors, and will also function satisfactorily in high-wing monoplanes, or in aircraft provided with more than one wing. Figs. 1 and 2 also depict nacelles which are suspended almost entirely beneath the wing 7, but the present invention is equally applicable to nacelles which are supported either centrally of the chord line of the wing, or above the wing, or at any intermediate position.

The trailing portions of the elongated nacelles 8 and 9 are preferably shaped such that as they taper rearwardly from the trailing edge of the wing 7 they reduce more rapidly in lateral dimension than vertically, thereby providing a trailing portion having greater vertical than horizontal dimension at any given transverse section. The trailing portion of each nacelle, which extends considerably aft of the wing, is preferably provided with a movable rudder portion 13 which may be pivotally mounted upon the vertical pivot 14 suitably supported by brackets (not shown) extending rearwardly from the main portion of the nacelle. Each nacelle is provided with a recessed portion 16 of suitable shape to permit rotative movements of the rudders 13 while maintaining to a maximum degree the continuity and streamlining of the surfaces of the nacelles and the movable rudder portions.

Referring now to Fig. 3, the left engine is indicated at 15L in the forward portion of its nacelle 8L and the right engine similarly indicated at 15R housed in the forward portion of its nacelle 8R. A pipe connection 17 is provided between the lubricating oil system of each engine and the control cylinder 18 provided in the forward portion of each nacelle. Pistons 19 are carried upon the piston rods 21 for reciprocating movement within each cylinder 18, being continually urged into their forward positions against the pressure of the engine lubricating systems by means of the compression springs 20 interposed between the pistons and the aft ends of the cylinders. The piston rods 21 are each pivotally connected to the actuating arms 22C and 22D of the control valves C and D located in the left and right nacelles, respectively. The valves C and D are of the four-way type being provided with four external ports, one of which is connected by the pipe or line of tubing Pc to the hydraulic pressure system P usually provided in the aircraft for the actuation of the retractable landing gears, wing flaps or other aircraft parts; a second port of the valve C is connected by the pipe Cp to an end of the actuating or servo-motor cylinder 24 located in the rear portion of the nacelle; a third port is connected by the pipe Rc to the return line R; and a fourth port is connected by the pipe 23L to the opposite end of the aforementioned servo cylinder 24. Similarly, the four-way valve D of the right engine is connected by the pipe Pd to the hydraulic pressure system P; a second port connected by the pipe Dp to the forward end of the right hand cylinder 24; a third port connected by the pipe Rd to the return line R; and its fourth port connected by the pipe 23R to the aft end of the right servo-cylinder 24.

The servo-cylinders 24, which are provided in both the right and left engine nacelles, are each equipped with a piston 25 normally held in the central or mid-portion of the cylinder by means of the compression springs 26 and 27 which are interposed between each piston face and the opposed ends of the cylinder. Piston rods 28 are fixed to each piston and are pivotally connected to levers 29 which are fixed to the rudder surfaces 13L and 13R and by which the latter are rotated about their pivot axes 14. A shut-off valve A is also provided in the line P from the hydraulic pressure system and an additional line Pb connects the pressure system with the four-way manual control valve B. The latter is connected by pipe B1 to the pipe Cp, by the pipe B2 to the pipe 23L and by the pipe Rb to the return line R. The hydraulic systems within each nacelle are suitably interconnected by the equalizer line E1 connecting the pipe Cp in the left nacelle with pipe 23R in the right nacelle; and similarly the equalizer line E2 connects the pipe Dp in the right nacelle with the pipe 23L in the left nacelle.

The system shown in Fig. 3 operates as follows: Assuming that it is desired that the system be operated automatically, the valve A would be opened by being rotated about 90° in either direction from the position shown in the drawings, and the valve B would remain closed as in the position shown. This permits hydraulic fluid pressure to flow from the aircraft system through the pipe P, the valve A and to the left and right control valves C and D, through pipes Pc and Pd, respectively, the flow through the pipe Pb being cut off by the closed valve B. As long as the left and right engines are running, engine oil pressure carried through the pipes 17 into the cylinders 18 hold the pistons 19 in the positions shown against the action of the compression springs 20, and by means of the piston rods 21 and the valve arms 22C and 22D the control valves C and D are maintained in their closed positions as shown. Assuming now that for some reason the left engine slows down materially or stops altogether, the oil pressure in its line 17 falls off, permitting the spring 20 in the left cylinder 18 to move the piston 19 forwardly causing the movable portion of the valve C to be rotated clockwise approximately 90°. This valve movement permits the valve ports to be interconnected such that the pressure from the hydraulic system is exerted through pipes Pc and Cp to the forward portion of the left cylinder 24 thereby exerting pressure against the piston 25 and a tendency to move the same rearwardly. At the same time the fluid in the rear portion of the left cylinder 24 is permitted to be displaced by rearward movement of the piston through the pipe 23L which is now interconnected by the valve C to the pipe Rc and the return line R. The oil, or other non-compressible liquid, used in the system and which passes into the return line R usually flows in a manner well known in the art to a suitable sump or reservoir (not shown) which is in turn connected to a pressure pump and returned to the hydraulic pressure system.

It will therefore be seen that as the pressure falls in the oil line 17 from the left engine, the piston 25 in the left cylinder, as the result of flow through valve C, is moved rearwardly and transmits, through the piston rod 28 and the arm 29, counter-clockwise movement to the left nacelle rudder 13L to its dotted position shown in Fig. 3. It will also be seen that as the hydraulic pressure is exerted in the line Cp between the control valve C and the left servo-cylinder 24, pressure is also exerted through the equalizer pipe E1 which extends across to the right nacelle and into the pipe 23R, exerting pressure in the rear portion of the right cylinder 24 tending to move its piston 25 in a forward direction. At the same time, the fluid which is displaced from the forward portion of the right cylinder 24 is permitted to flow across through the equalizer pipe E2 and into the line 23L which has been opened, by movement of the valve C, to the pipe Rc and the return line R. Inasmuch as the right engine is still running, oil pressure in its pipe 17 maintains the piston in its central position and the valve D remains closed, the piston in the right cylinder 24 is caused to move forwardly (in a direction opposite to that of the piston in the left cylinder) resulting in counter-clockwise rotation of the rudder 13R into the dotted position shown. Due to the forward motion of the airplane and the blast from the propeller of the running engine, the movement of the rudders 13R and 13L into their dotted positions results in a correcting moment being applied to the airplane, which opposes and neutralizes the yawing moment created by the offset thrust exerted by the right engine and its tractor propeller 10, which would otherwise cause yawing or counter-clockwise turning about the vertical axis of the airplane.

Similarly, when both engines are running, and a failure of the right engine occurs, the control valve D in the right engine nacelle is opened, while the valve C in the left nacelle remains closed, and the piston 25 in the right hand cylinder 24 moves rearwardly due to fluid pressure passing through pipes Pd, the valve D and the pipe Dp causing clockwise rotation of the rudder 13R. Similarly, the fluid expelled from the right cylinder 24 by rearward movement of the piston 25 passes through the line 23R, and the valve D, the line Rd and into the return line R. Simultaneously, when the right engine has stopped the pressure flowing from Pd through the valve D into the line Dp also passes across the equalizer line E2 into the line 23L and the rear portion of the left cylinder 24 causing clockwise rotation of the left rudder 13L due to forward motion of the left piston 25 expelling fluid from the forward portion of its cylinder through the pipe Cp across the equalizer line E1 through 23R, the valve D, the line Rd and thence into the return line R.

When it is desired that the automatic device of the system shown in Fig. 3 be disconnected and the nacelle rudders be operated manually by the pilot, the valve A is closed or brought into the position shown in Fig. 3, and the rudders controlled by movement of the handle of the valve B. Assuming that it is desired to move the rudders 13L and 13R in a counterclockwise direction into their dotted positions, the handle of the valve B is rotated approximately 90° in a clockwise direction thereby interconnecting line Pb with B1 and line B2 with line Rb. As fluid pressure flowing from the line P is deflected into the line Pb by the closed shut-off valve A, it flows through the valve B into line B1 to line Cp where it flows into the forward portion of the left cylinder 24 causing its piston to move rearwardly, and also flows across the equalizer line E1 into the line 23R to the rear portion of the right cylinder 24 causing forward movement of its piston 25. The fluid which is discharged from the rear portion of the left cylinder 24 is carried into the line 23L through pipe B2, the valve B, the line Rb and thence into the return line R. Likewise the fluid which is expelled from the forward portion of the right cylinder 24 is carried into the line Dp across through the equalizer line E2 into line 23L, line B2 through the valve B, line Rb and the return line R. Obviously, when it is desired to rotate the nacelle rudders 13L and 13R in the opposite or clockwise directions, it is merely necessary to rotate the handle of the valve B through approximately 90° in a counter-clockwise direction from the position shown in Fig. 3 thereby connecting pipe B1 with the return lines Rb and R, utilizing the equalizer line E1 for the expelled fluid, while at the same time interconnecting the pressure line Pb with the line B2 placing in circuit the equalizer line E2 for transmission of pressure to the right nacelle. The valves A and B are preferably located within the fuselage 6 convenient to the pilot.

Fig. 4 shows a modification of the system shown in Fig. 3 in which the engine oil pressures are also utilized to automatically actuate the nacelle rudders, and mechanical means is provided for manually adjusting the rudders 13R and 13L at the will of the pilot. In this figure the left and right engines are also designated 15L and 15R respectively, each being provided with a similar oil pressure lubricating line 17 flowing through the lines PL and PR to the shut-off valves F and G, respectively. The valves F and G are interconnected by an equalizer line E3 and are also each connected by the lines 30L and 30R to the opposed ends of the cylinder 30. The latter is provided with a piston 31 normally maintained in its neutral or central position within the cylinder by means of the springs 34, and being fixedly attached to a piston rod 32 which extends outwardly from the piston in both directions through the ends of the cylinder 30 and is connected to the operating cables 33L and 33R. These cables extend laterally over the sheaves 33S within the nacelles and are connected to suitable rudder control horns 35 by which the rudders are rotated about their pivots 14. The inwardly extending arms of the control horns 35 are interconnected by the cables 33L and 33R to the lower end of a control stick 36 pivotally carried upon the aircraft structure at 37 at a location convenient to the pilot or operator.

The control system disclosed in Fig. 4, in the position of the valves F and G as shown, is arranged for automatic operation of the nacelle rudders upon failure of either engine. While both engines are running the lubricating oil pressures in both lines 17 are substantially equal and the piston 31 is maintained, both by the springs 34 and the equal oil pressures, in its central position as shown. In this position of the valves F and G in which the pressure lines PL and PR are connected, respectively, to the lines 30L and 30R, the equalizer line is cut off from the system. Assuming now that the left engine 15L slows down or stops altogether, the oil pressure in the lines PL and 30L is reduced materially, and that from the running engine flowing through lines PR and 30R causes an unbalanced pressure on opposite sides of the piston 31. This results in piston movement to the left, causing the rudders 13L and 13R to be moved into the dotted positions shown due to the interconnecting cables 33, and a corresponding pivotal movement is imparted to the control stick 36. Likewise, while both engines are running if the right engine should fail the piston 31 would be caused to move in the opposite direction or toward the right engine and the rudders 13R and 13L would be rotated in a clockwise direction into their opposite positions to correct the yawing moment caused by the offset propulsive effect.

When it is desired that the control system shown in Fig. 4 be operated manually while one or both of the engines are running, the handles of the valves F and G are rotated outwardly in the directions of the arrows such that valve F connects the line 30L with the equalizer line E3 and the valve G similarly connects the line 30R with the equalizer line E3. This prevents oil pressure from either engine from entering the cylinder 30 or the equalizer line E3 and permits the pilot to operate the control stick 36 for movement of the rudders in any desired direction without the necessity of overcoming hydraulic pressures. Assuming that the rudders 13R and 13L are moved into their dotted positions the handle of the control stick 36 would be moved in a clockwise direction, or to the left, causing the piston 31 to move to the left, the displaced fluid readily flowing from the cylinder through the line 30L, the equalizer line E3 and back to the other end of the cylinder through the line 30R. In a similar manner, when it is desired to move the nacelle rudders into their opposite position from those shown dotted in Fig. 4 the handle of the control stick 36 is rotated in a counter-clockwise direction, or toward the right.

In Fig. 5 is shown an improved type of nacelle rudder in which the nacelle 8 is provided with a cut-out trailing portion 16a and vertical pivots 14a and 14b. Split complementary rudder portions 13a and 13b are each pivotally mounted upon the pivots 14 and suitable operating mechanism is provided whereby, when it is desired to move the nacelle rudder in a counter-clockwise direction the rudder portion 13b is moved outwardly into the airstream while the portion 13a remains in its normal position in which it is streamlined with the remainder of the surface of the nacelle 8. It should be noted particularly that the nacelle rudders shown and described in the present application are such that during the normal operation of the aircraft they form an integral part of the aerodynamic surface of the nacelles, and in the normal or neutral position they therefore do not add any drag or resistance to that normally produced by the nacelle. By properly designing the springs in the several control and servo cylinders shown, the control valves and control surfaces may be caused to operate at predetermined drops in engine pressures. The use of the nacelle or empennage rudders for manual or automatic trimming purposes obviates the necessity of using the main rudder 38 in Fig. 6, or its trimming tab in an offset position for straight line flying.

Other modifications, both in arrangement and details of design, which may occur to those skilled in the art after a reading of the foregoing specification are intended to fall within the scope and spirit of the present invention as more clearly defined by the appended claims.

I claim:

1. In an aircraft having an empennage rudder for normal steering control, a plurality of laterally disposed engines for the propulsion of the aircraft, nacelles enclosing each of said engines, movable auxiliary control surfaces normally forming aligned trailing portions of said nacelles, an hydraulic pressure source, four-way control valves for each engine actuated by the lubricating oil pressure thereof, servo-motor cylinders operatively connected to said control surfaces, fluid means interconnecting said control valves with said servo-motor cylinders and said pressure source whereby predetermined drops in lubricant pressure in any of said engines automatically actuates each of said auxiliary control surfaces into positions compensating for the greater propulsive effect of an oppositely disposed engine, and a manually operated four-way valve connected to said pressure source and to said servo motor cylinder to selectively operate said control surfaces upon the interruption of said automatic operation by closure of said pressure source connection to the first said four-way control valves.

2. In multi-engined aircraft having an empennage rudder for normal steering control, the combination with a streamlined engine nacelle, of a pivotally mounted auxiliary control surface normally forming an aligned trailing portion of said nacelle and means to rotate said surface about its pivot into the airstream flowing over said nacelle for steering control conditions required by operation of said engine.

3. In multi-engined aircraft having an empennage rudder for normal steering control, a laterally disposed engine, a streamlined nacelle enclosing said engine, the entire trailing portion of said nacelle being provided with separately pivoted complementary movable surfaces laterally disposed to form an auxiliary rudder, said auxiliary movable surfaces conforming to the streamline form of said nacelle such that in their normal aligned positions the surfaces do not add to the total surface resistance of said nacelle and separate control means for the independent operation of the said normal and auxiliary rudders.

4. The combination with a motor nacelle in a multi-engined airplane of the type which includes automatic means for rudder actuation initiated by engine failure, of an auxiliary rudder surface normally forming the rearwardly tapering surface of said nacelle, said rudder surface being pivotally mounted upon said nacelle for projection into the airstream passing said nacelle only upon rotation from said normal streamlined position.

5. The combination with an aircraft having a fuselage, a main wing extending laterally from said fuselage and an empennage assembly including a rudder disposed at the trailing portion of said fuselage, of a motor nacelle carried by said wing laterally spaced from said fuselage, the trailing terminal portion of said nacelle being reducingly formed into complementary movable portions, said movable portions normally disposed such that they form a continuous and uninterrupted streamline portion of the said motor nacelle and control means selectively operable for the separate movement of said empennage rudder and said nacelle trailing portions for the directional control of said aircraft.

6. In an aircraft having a fuselage, an empennage assembly including a rudder carried at the aft portion of said fuselage, a main sustaining surface, a plurality of motor nacelles carried by said main surface, movable control surfaces reducingly forming the extreme trailing portion of each said nacelle, the said movable surfaces lying in the same smooth and continuous streamline shape of each said nacelle, control means for the operation of said empennage rudder and means initiated by failure of one of said motors for actuating said control means and said movable nacelle surfaces whereby the resulting yawing tendency of the aircraft is compensated for.

7. In an aircraft having a plurality of motors, one of said motors having a lubricating oil system, a streamlined rearwardly tapering nacelle enclosing the said motor, a control surface movably mounted upon and constituting a part of the tapering portion of said nacelle such that it forms an integral trailing portion thereof in its neutral position, said control surface extending into the airstream only upon movement from said neutral position, and means actuated by a drop in lubricating oil pressure of one of said motors for moving said control surface into the airstream.

8. In an aircraft, the combination with a fuselage, an empennage rudder controllably mounted upon the trailing portion of said fuselage, a plurality of engines laterally disposed with respect to said fuselage for the propulsion of the aircraft, and a streamlined nacelle enclosing one of said engines, said nacelle having a pivotally mounted trailing portion forming in its neutral position an integral and continuous streamlined portion of said nacelle, the said pivoted trailing portion being adapted to be rotated into the airstream flowing past said streamlined nacelle for use as an auxiliary rudder and means separate from the empennage rudder control means for the actuation of said auxiliary nacelle rudder.

9. In an aircraft, the combination with a plurality of laterally disposed engines for the propulsion of the aircraft and streamlined nacelles enclosing each of said engines, of rotatably mounted control surfaces forming continuous and aligned trailing portions of said nacelles, said movable control surfaces being addressed only to the airstream passing said nacelles when rotated from their normal aligned position, and automatic means initiated by variation in the propulsive effect of one of said motors adapted to actuate said movable control surfaces.

10. In an aircraft, a fuselage, a streamlined nacelle having a body portion of substantially circular cross section and a normally aligned reducing trailing portion, said nacelle being laterally disposed with respect to said fuselage, the said trailing portion being rotatably mounted upon pivot means entirely contained within the streamlined form of said nacelle such that said trailing portion forms a control surface movable into the airstream passing over the said nacelle only upon rotation from its said normally aligned position.

11. In an aircraft, a fuselage, a streamlined nacelle having a body portion of circular cross section and an aligned reducing trailing portion of elliptical cross section with its major axis vertically disposed, said nacelle being laterally disposed with respect to said fuselage, a split-trailing edge rudder portion provided within said nacelle trailing portion, the said rudder portion being separately and laterally pivoted upon vertical axes such that the rudder sections upon outward and opposite rotation separate rearwardly from the said nacelle body portion along a transverse plane and separate from each other along a vertical longitudinally disposed line of separation, said rudder portion being projectible into the airstream passing around said nacelle only upon rotation from said aligned position.

WALTER A. HAMILTON.